US011888725B2

(12) United States Patent
Chandrappa et al.

(10) Patent No.: US 11,888,725 B2
(45) Date of Patent: *Jan. 30, 2024

(54) MULTI-CAST SUPPORT FOR A VIRTUAL NETWORK

(71) Applicant: Microsoft Technology Licensing, LLC, Redmond, WA (US)

(72) Inventors: Harish Kumar Chandrappa, Bothell, WA (US); Adarsh Kirnelli Rangaiah, Bothell, WA (US); Milan Dasgupta, Seattle, WA (US); Daniel Max Firestone, Seattle, WA (US); Michal Czeslaw Zygmunt, Bellevue, WA (US); Xinyan Zan, Sammamish, WA (US); Rishabh Tewari, Sammamish, WA (US); Eric Lawrence Albert Lantz, Sammamish, WA (US); Deepak Bansal, Yarrow Point, WA (US); Young Lee, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/507,719

(22) Filed: Oct. 21, 2021

(65) Prior Publication Data
US 2022/0150156 A1    May 12, 2022

Related U.S. Application Data

(63) Continuation of application No. 16/428,868, filed on May 31, 2019, now Pat. No. 11,184,274.

(51) Int. Cl.
*H04L 45/16* (2022.01)
*G06F 9/455* (2018.01)
(Continued)

(52) U.S. Cl.
CPC .......... *H04L 15/16* (2013.01); *G06F 9/45558* (2013.01); *H04L 12/4633* (2013.01);
(Continued)

(58) Field of Classification Search
None
See application file for complete search history.

(56) References Cited

U.S. PATENT DOCUMENTS 7,801,953 B1 * 9/2010 Denman ............. H04L 65/4061
370/312
11,184,274 B2 * 11/2021 Chandrappa ............ H04L 45/16
(Continued)

OTHER PUBLICATIONS

"Notice of Allowance Issued In European Patent application No. 20724375.9", dated May 11, 2023, 8 Pages.
(Continued)

*Primary Examiner* — Jutai Kao
(74) *Attorney, Agent, or Firm* — Newport IP, LLC; Han K. Gim

(57) ABSTRACT

Described herein are systems and methods for supporting multicast for virtual networks. In some embodiments, a native multicast approach can utilized in which packet replication is performed on a host node of a virtual machine (VM) with a multicast data packet encapsulated in uniquely address unicast packets. In some embodiments, a network virtual appliance can be utilized. A multicast packet sent from the VM can be unicasted to the network virtual appliance. The multicast appliance can then replicate the packet into multiple copies and send the packets to the receivers in the virtual network as unicast data packets encapsulating the multicast packet.

20 Claims, 8 Drawing Sheets

(51) Int. Cl.
*H04L 12/46* (2006.01)
*H04L 45/64* (2022.01)
*H04L 45/00* (2022.01)
*H04L 15/16* (2006.01)

(52) U.S. Cl.
CPC .......... *H04L 12/4641* (2013.01); *H04L 45/64* (2013.01); *H04L 45/66* (2013.01); *G06F 2009/45595* (2013.01)

(56) References Cited

U.S. PATENT DOCUMENTS

2019/0068524 A1* 2/2019 Shepherd .............. H04L 12/189
2019/0097839 A1* 3/2019 Narayanan .......... H04L 12/4633

OTHER PUBLICATIONS

"Notice of Allowance Issued in European Patent Application No. 20724375.9", dated Sep. 20, 2023, 8 Pages.

* cited by examiner

MULTI-CAST SUPPORT FOR A VIRTUAL NETWORK

CROSS-REFERENCE TO RELATED APPLICATION

This application is a continuation of U.S. patent application Ser. No. 16/428,868, filed May 31, 2019, the content of which application is hereby expressly incorporated herein by reference in its entirety.

BACKGROUND

Multi-cast is a group communication technique in which message(s)/data sent to multicast address is received by all the members in the group of destination computers (e.g., physical and/or virtual). Destination computers join or leave a multi-cast group. When packet(s) are published to a particular multicast IP address by a source computer, the packet(s) are duplicated and then forwarded (e.g., simultaneously) to the subscribing destination computers.

SUMMARY

Described herein is a system for supporting multicast on a virtual network, comprising: a computer comprising a processor and a memory having computer-executable instructions stored thereupon which, when executed by the processor, cause the computer to: at a node hosting a source virtual machine of the virtual network: receive a multicast data packet from an application of the source virtual machine, the multicast data packet including a multicast destination IP address and a multicast destination media access control (MAC) address; apply a connectivity policy to the multicast data packet, the policy including a rule, a network configuration, and/or a multicast configuration matching the multicast destination IP address, wherein application of the policy creates a replica of the multicast data packet for each of a plurality of members; for each particular replica of the multicast data packet, at least one of translating the multicast destination media access control address to a unicast destination media access control address and/or modifying the multicast destination IP address to a pre-defined unicast IP address (e.g., special unicast IP hinting multicast) ("modified inner packet"); encapsulating this modified inner packet with underlay unicast IP headers along with a destination address of the host machine where each particular replica resides. In some embodiments, if the inner packet is modified to pre-defined unicast IP then the actual multicast address may be carried in the underlay headers as extensions or proprietary protocols.

Also described herein is a computer storage media storing computer-readable instructions that when executed cause a computing device to: at a node of the virtual network hosting a source virtual machine: receive a multicast data packet from an application of the source virtual machine, the multicast data packet including a multicast destination IP address and a multicast destination media access control (MAC) address; encapsulate the multicast data packet with a destination IP address of a multicast appliance (with or without modification(s) to an inner packet as referenced above); and forward the encapsulated multicast data packet to the multicast appliance as a unicast packet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
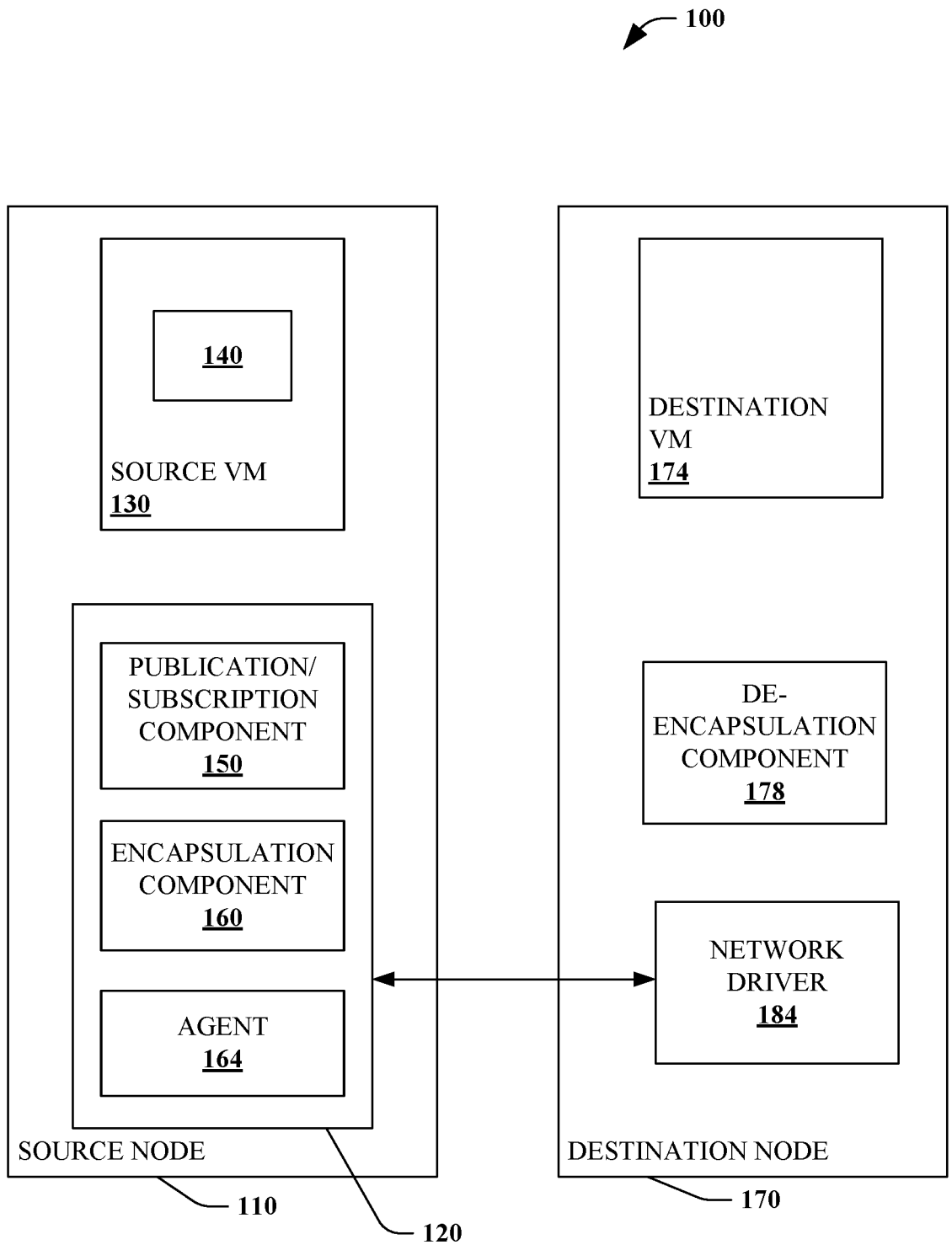
FIG. 1 is a functional block diagram that illustrates a system for multicast support for a virtual network.

Various technologies pertaining to multi-cast support for virtual network(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding multi-cast support for a virtual network. What follows are one or more exemplary systems and methods.

Aspects of the subject disclosure pertain to the technical problem of supporting multi-cast communications on a virtual network. The technical features associated with addressing this problem involve at a node hosting a source virtual machine of the virtual network: receive a multicast data packet from an application of the source virtual machine, the multicast data packet including a multicast destination IP address and a multicast destination media access control (MAC) address; apply a connectivity policy to the multicast data packet, the policy including a rule, a network configuration, and/or a multicast configuration matching the multicast destination IP address, wherein application of the policy creates a replica of the multicast data packet for each of a plurality of members; for each particular replica of the multicast data packet; translating the multicast destination media access control address to a unicast destination media access control address (or modifying the destination multicast IP to a special unicast IP (e.g., hinting multicast)) ("inner packet"); encapsulating with underlay unicast IP headers along with the destination(s) of the host machine where each replica resides. In some embodiments, when the inner packet is modified to unicast, then the actual multicast address can be carried in the underlay headers as extensions and/or proprietary protocols. Accordingly, aspects of these technical features exhibit technical effects of more efficiently and effectively providing multicast support for virtual networks, for example, reducing consumption of computer resource(s) and/or communication bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Typical usage of multicast includes video conferencing, real-time price quotes of securities trading, video feeds from surveillance cameras and IoT devices. Multicast is generally not supported by cloud provider(s) at present. The public cloud network is made of millions of servers. Providers implement multitenant environment using the shared virtual local area network (VLAN) and underlay networking ideas with virtual extensible LAN (VXLAN), network virtualization using generic routing encapsulation (NVGRE) or other tunneling protocol(s). The providers generally do not utilize the underlay network address to transmit the multicast packets. The unpredictability of the number of receivers and resource constraints on the nodes doesn't allow multicast to be solely implemented in the overlay network. For these reasons, no cloud provider support multicast at platform level.

There are several challenges involved in supporting multicast at scale because packet duplication can be costly in the datapath. In addition, there are control packets that multicast protocols send to subscribe and leave multicast group(s) and tracking these dynamic memberships would require complex control plane changes. Due to this lack of multicast support in the cloud, cloud customers currently cannot bring their multicast workload onto the cloud.

Described herein is a system and method for supporting multicast for virtual networks. In some embodiments, a native multicast approach is utilized in which packet replication is performed on a host node of a virtual machine (VM) or container host. In some embodiments, a multicast packet sent from the VM can be unicasted to a network virtual appliance (e.g., with or without modifications to the inner packet such as carry hints about the multicast packet(s) in the underlay headers). The multicast appliance replicates the packet into multiple copies and sends it to the receivers in the virtual network as a unicast data packet encapsulating the multicast packet.

In some embodiments, existing multicast applications do not need to change in order to move to a virtual machine/cloud-based environment. A customer can define multicast group membership either statically or dynamically. In the static membership management, customers can define members of the groups through a portal or API. For dynamic membership management, the VM sends out internet group management protocol (IGMP)/multicast listener discovery (MLD) control packets and the virtual filtering platform performs membership tracking, as discussed in greater detail below.

Native Multicast

Referring to FIG. 1, a system for multicast support for a virtual network 100 is illustrated. The system 100 includes a source node 110 having a connectivity component 120 that manages connectivity for a source virtual machine 130 including a source application 140.

The system 100 utilizes a native multicast mode in which packet replication is performed on the source node 110. The source application 140 and/or the source virtual machine 130 sends a single packet to a multicast destination (multicast packet) and the connectivity component 120 of the source node 110 replicates the multicast packet, encapsulate the multicast packet within a uniquely address unicast packet (e.g., uniquely addressed to each member), and, sends the encapsulated multicast packet to multiple receivers (e.g., members) as the unicast packet. In some embodiments, the native multicast mode can be used for latency-sensitive application(s) and/or for multicast groups with less than a threshold quantity of members (e.g., less than one hundred members). In some embodiments, the connectivity component 120 can include a field programmable gate array (FPGA) programmed to perform at least some of the packet replication, encapsulation, and/or unicast packet sending to further reduce latency.

In some embodiments, the connectivity component 120 employs a layered model:

TABLE 1

| Layer 7 | Application |
| Layer 6 | Presentation |
| Layer 5 | Session |
| Layer 4 | Transport |
| Layer 3 | Network |
| Layer 2 | Data Link |
| Layer 1 | Physical |

The connectivity component 120 can capture connectivity state associated with layers 2, 3, and/or 4 of the layered model of Table 1.

In some embodiments, the connectivity component 120 can perform actions with respect to the transport layer (layer 4) which include information regarding firewall state, transport security layer (TSL), encryption and/or decryption key(s) associated with connectivity of the source application 140. In some embodiments, the connectivity component 120 can perform action(s) with respect to the network layer (layer 3), by encapsulating addressing information regarding the multicast packet, and, addressing each unicast packet to particular members.

The connectivity component 120 can include a publication/subscription component 150 that manages multicast information for multicast communication(s) of the source application 140 (e.g., member information). In some embodiments, IGMP/MLD request(s) from the source virtual machine 130 are intercepted by a network driver (virtual filtering platform (VFP)) (not shown) which sends the request(s) to an agent 164 running on the source node 110. The agent 164 then publishes this control packet to the publication/subscription component 150 which tracks membership and further allows the agent 164 to add rules required for replication and unicast forwarding to multiple destinations. In some embodiments, the publication/subscription component 150 can include a local cache (not shown) that periodically and/or asynchronously receives membership updates from a central location that maintains membership information for a plurality of multicast groups and/or publication/subscription components 150 of a plurality of virtual machines.

The connectivity component 120 can receive a multicast packet sent from the source application 140 and/or the source virtual machine 130. The multicast packet includes a multicast destination IP address (DIP) and a multicast destination media access control address (MAC).

The connectivity component 120 can include an encapsulation component 160 that processes the multicast packet in multiple passes. In a first pass, the multicast packet (e.g., as received from the container, the source application 140 and/or the source virtual machine 130) is subject to application of any transportation, network, and/or data (e.g., Ethernet) layer (layer 4) policy(ies) (e.g., security policy (ies). The first pass is sometimes referred to here as the "slow path" as application of transportation layer policy(ies) can increase communication latency times.

Once the multicast packet has been successfully processed on the "slow path", during processing in the transportation layer, a rule can be applied matching the DIP of the multicast packet to a multicast group as stored in the publication/subscription component 150. A quantity of members ("N") to the multicast packet can be determined from the publication/subscription component 150, and, N replicas of the multicast packet can be created (e.g. one for each member) with customer address (CA) metadata added. Since the original multicast packet (as received from the source application 140 and/or the source virtual machine 130) was subject to the "slow path" (e.g., application of full security policy(ies)), the created replicas can bypass the "slow path" with the CA metadata used as a match condition to bypass the "slow path". In this manner, a flow is created after members after evaluated on the first packet after interaction with agent and publication/subscription (slow path) such that the individual flows can take a "fast path" bypassing interaction with the agent and publication/subscription. In some embodiments, these flows can be offloaded to a field programmable gate array or ASIC.

Figure 2:
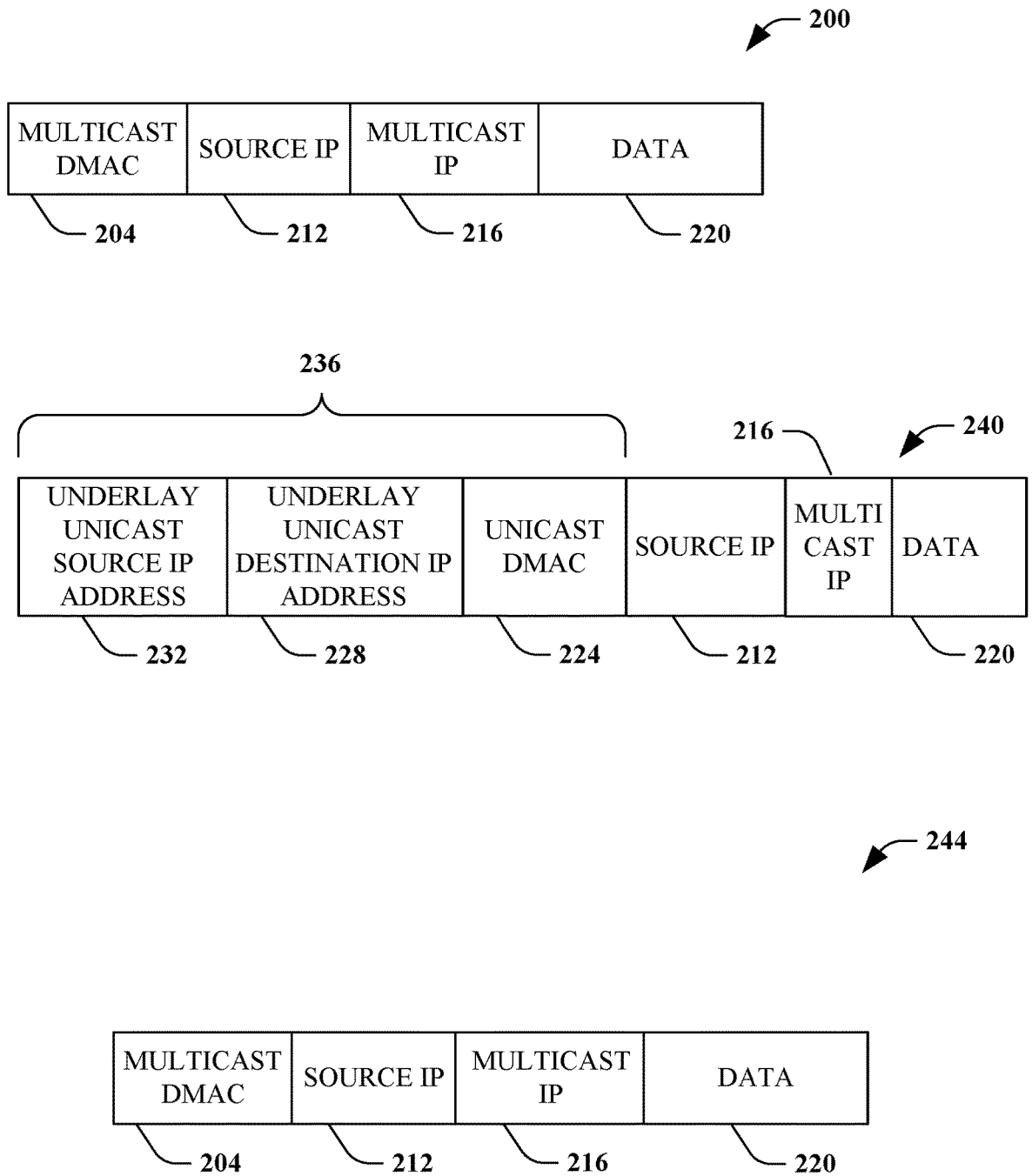
FIG. 2 is a diagram packet conversion diagram.

Referring to FIG. 2, a packet conversion diagram is illustrated. A multicast data packet 200 includes a multicast DMAC 204, a source IP address( ) 212, a multicast IP address 216 and data 220. Turning to FIG. 1 with continued reference to FIG. 2, in order to overcome the inability to transmit multicast packets over the virtual network, in each replica, the encapsulation component 160 can encapsulate address information regarding the multicast data packet, and, uniquely address each unicast replica packet to particular members. In some embodiments, the encapsulation component 160 can perform encapsulation by translating the multicast DMAC 204 to a unicast DMAC 224 in order to be able to reuse existing layer 2 forwarding and deliver the packet to the correct virtual machine. Thereafter, an underlay unicast destination IP address 228 associated with a particular member associated with the particular replica and an underlay unicast source IP address 232 can be added, collectively referred to as the outer IP header 236, to form encapsulated unicast data packet 240.

The connectivity component 120 can then send the unicast data packet for each particular replica. In some embodiments, the unicast data packets are sent out sequentially. In some embodiments, the unicast data packets set sent out in parallel. These unicast data packets (which are encapsulating the original multicast data packet) are processed by the datacenter network (not shown) including physical switches as a unicast packet.

Optionally, the system 100 can further include a destination node 170 hosting a destination virtual machine 174. The destination node 170 further comprises a de-encapsulation component 178.

The de-encapsulation component 178 receives a particular unicast replica (e.g., specifically addressed to destination virtual machine 174). The de-encapsulation component 178 recognizes the unicast replica as an encapsulated multicast packet, and, deduces the destination virtual machine 174 to deliver the multicast packet to from the outer IP header. The de-encapsulation component 178 can remove the outer IP header.

A network driver 184 of the destination node 170 can translate the unicast MAC address in the de-encapsulated packet to the multicast MAC address in order to successfully deliver the multicast packet to the destination virtual machine 174. Referring to FIG. 2 with continued reference to FIG. 1, the de-encapsulation component 178 can translate the encapsulated data packet 240 to a de-encapsulation data packet 244 (which matches the original multicast data packet 200).

In some embodiments, the multicast MAC address can be derived by placing 23 low-order bits of the IP Multicast address (logical OR) in the low-order 23 bits (or last 3 Hex digits minus the highest order bit) of the Ethernet or IEEE 802 net multicast address. The destination virtual machine 174 (which is unaware of the transforms from multicast to unicast back to multicast), listening on the multicast MAC address, can then receive the multicast packet 240 from the network driver 184.

Multicast Appliance

Figure 3:
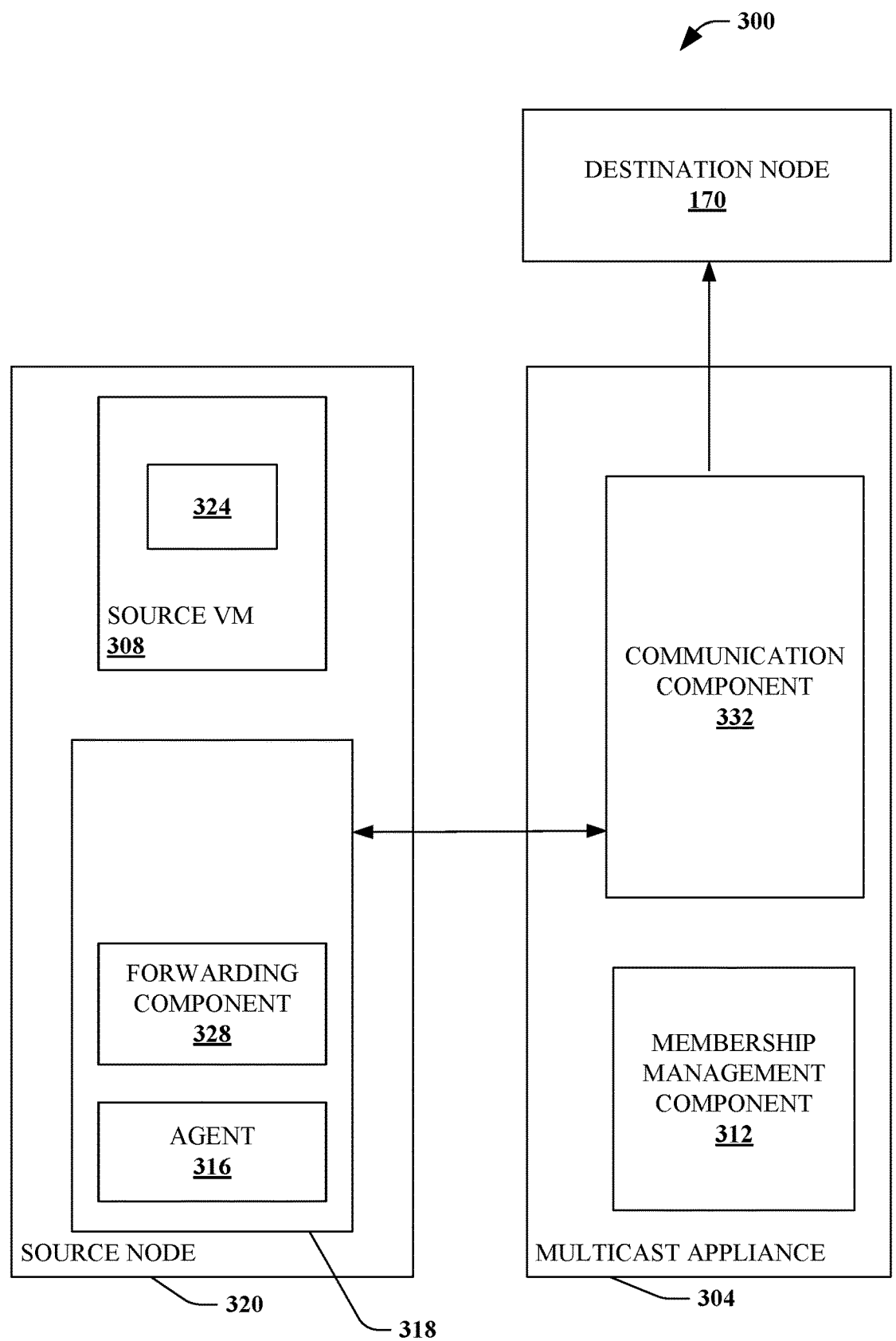
FIG. 3 is a functional block diagram that illustrates a system for multicast support for a virtual network.

Turning to FIG. 3, a system for multicast support for a virtual network 300 is illustrated. The system 300 includes a multicast appliance 304 that processes multicast data packets, received as unicast packets, from a source virtual machine 308. The multicast appliance 304 replicates the multicast packet into multiple copies and sends it to receivers in the virtual net as unicast packets encapsulating the multicast packet. In some embodiments, the system 300 is suitable for multicast groups with large number of members.

The multicast appliance 304 includes a membership management component 312 that handles multicast membership management and any other control plane processing. In some embodiments, an agent 316 provide a rule a network driver (VFP) (not shown) to unicast control packet(s) from a customer virtual machine to the multicast appliance 304 in the same virtual network. The network driver then forwards IGMP/MLD request(s) from virtual machines in the same virtual network to the multicast appliance 304.

With respect to the data plane, a connectivity component 318 of a host node 320 of the source virtual machine 308 can include a rule, for example, provided by the agent 316, to unicast forward multicast packet(s) received from a source application 324 and/or the source virtual machine 308 to the multicast appliance 304. A forwarding component 328 can encapsulate the multicast data packet with a destination IP address of the multicast appliance 304 and send the encapsulated multicast data packet as a unicast packet to the multicast appliance 304.

The multicast appliance 304 can include a communication component 332 that can de-encapsulate the multicast data packet from the received unicast packet. Thereafter, the communication component 332 can determine a quantity of members ("M") to the multicast packet from the membership management component 312, and M replicas of the multicast packet can be created (e.g. one for each member).

Each replica can be transformed into a unicast data packet by translating the multicast destination media access control address to a unicast destination media access control access address. A destination IP address associated with a particular member associated with the particular replica, and, adding an underlay unicast IP address can be added (outer IP header). Thereafter, the communication component 332 can send the unicast data packet for each particular replica. Optionally, the system 300 can further include a destination node 170 hosting a destination virtual machine 174, as described above.

In some embodiments, the system 300 can enable on premise integration by preserving host-side multicast semantics. To enable multicast send to on premise, each multicast packet can be forwarded to a multicast appliance 304. The multicast appliance 304 performs processing as described above and sends unicast data packet(s) encapsulating multicast data packet(s) over an Internet Protocol Security (IPSec) tunnel to an on premise gateway.

To support multicast receive from an on premise network, multicast traffic is routed from an on premise gateway to on premise virtual private network (VPN) gateway or express route gateway. The on premise gateway sends multicast traffic over a VPN tunnel to a cloud gateway. The cloud gateway forwards multicast traffic to a multicast appliance 304 in that virtual network. The multicast appliance 304 subscribes to multicast membership update(s) in that virtual network and replicates multicast traffic to virtual machine(s) in the destined multicast group.

FIGS. 4-7 illustrate exemplary methodologies relating to multi-cast support for a virtual network. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 4:
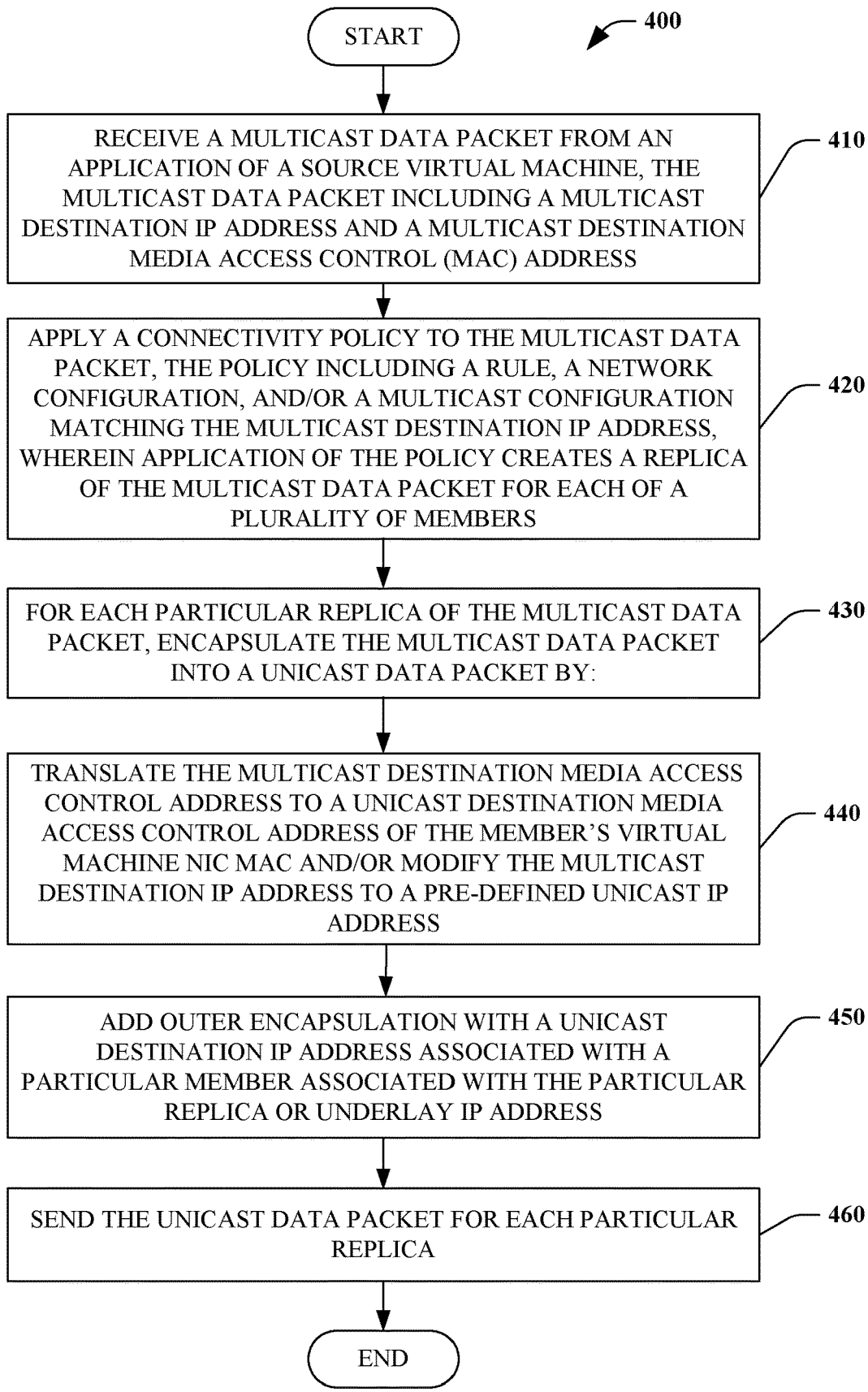
FIG. 4 is a flow chart that illustrates a method of supporting multicast for a virtual network.

Referring to FIG. 4, a method of supporting multicast on a virtual network 400 is illustrated. In some embodiments, the method 400 is performed by the host node 110 (a node hosting a source virtual machine of the virtual network).

At 410, a multicast data packet is received from an application of the source virtual machine. The multicast data packet including a multicast destination IP address and a multicast destination media access control (MAC) address.

At 420, a connectivity policy is applied to the multicast data packet. The policy includes a rule matching the multicast destination IP address such that application of the rule creates a replica of the multicast data packet for each of a plurality of members.

At 430, for each particular replica of the multicast data packet, the multicast data packet is encapsulated into a unicast data packet by performing acts 440, 450, and/or 460. At 440, the multicast destination media access control address is translated to a unicast destination media access control address of the member's virtual machine network interface controller (NIC) MAC. Additionally and/or alternatively, the multicast destination IP address can be modified to a pre-defined (e.g., special) unicast IP address (e.g., hinting at multicast). At 450, an outer encapsulation with a destination IP address associated with a particular member associated with the particular replica or an underlay IP address is added. At 460, the unicast data packet is sent for each particular replica.

Figure 5:
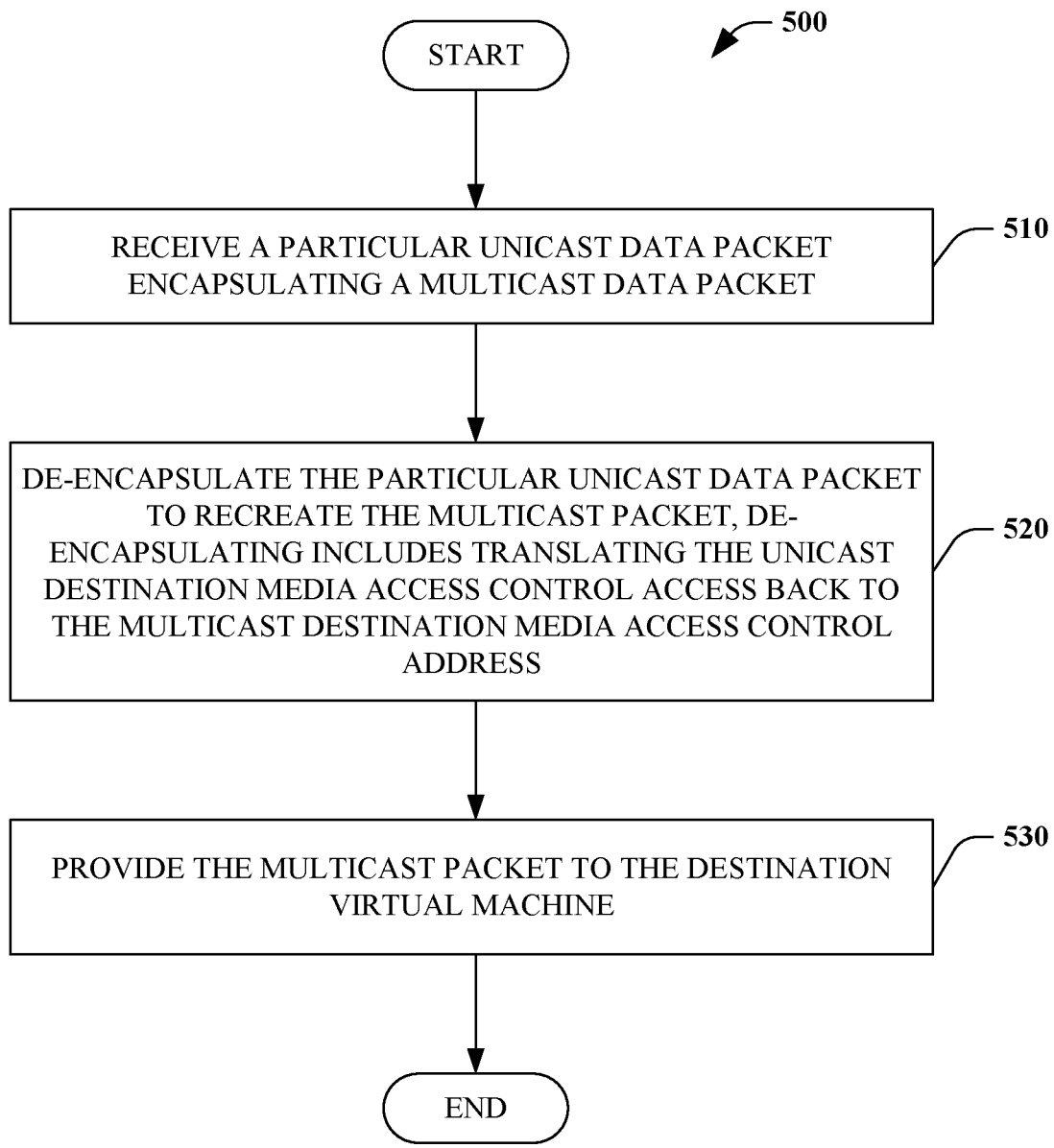
FIG. 5 is a flow chart that illustrates a method of supporting multicast for a virtual network.

Turning to FIG. 5, a method of supporting multicast on a virtual network 500 is illustrated. In some embodiments, the method 500 is performed by the destination node 170 and/or the destination node 328 (e.g., node hosting a destination virtual machine).

At 510, a particular unicast data packet encapsulating a multicast data packet is received. At 520, the particular unicast data packet is de-encapsulated to recreate the multicast packet. De-encapsulating includes translating the unicast destination media access control access back to the multicast destination media access control address. At 530, the multicast packet is provided to the destination virtual machine.

Figure 6:
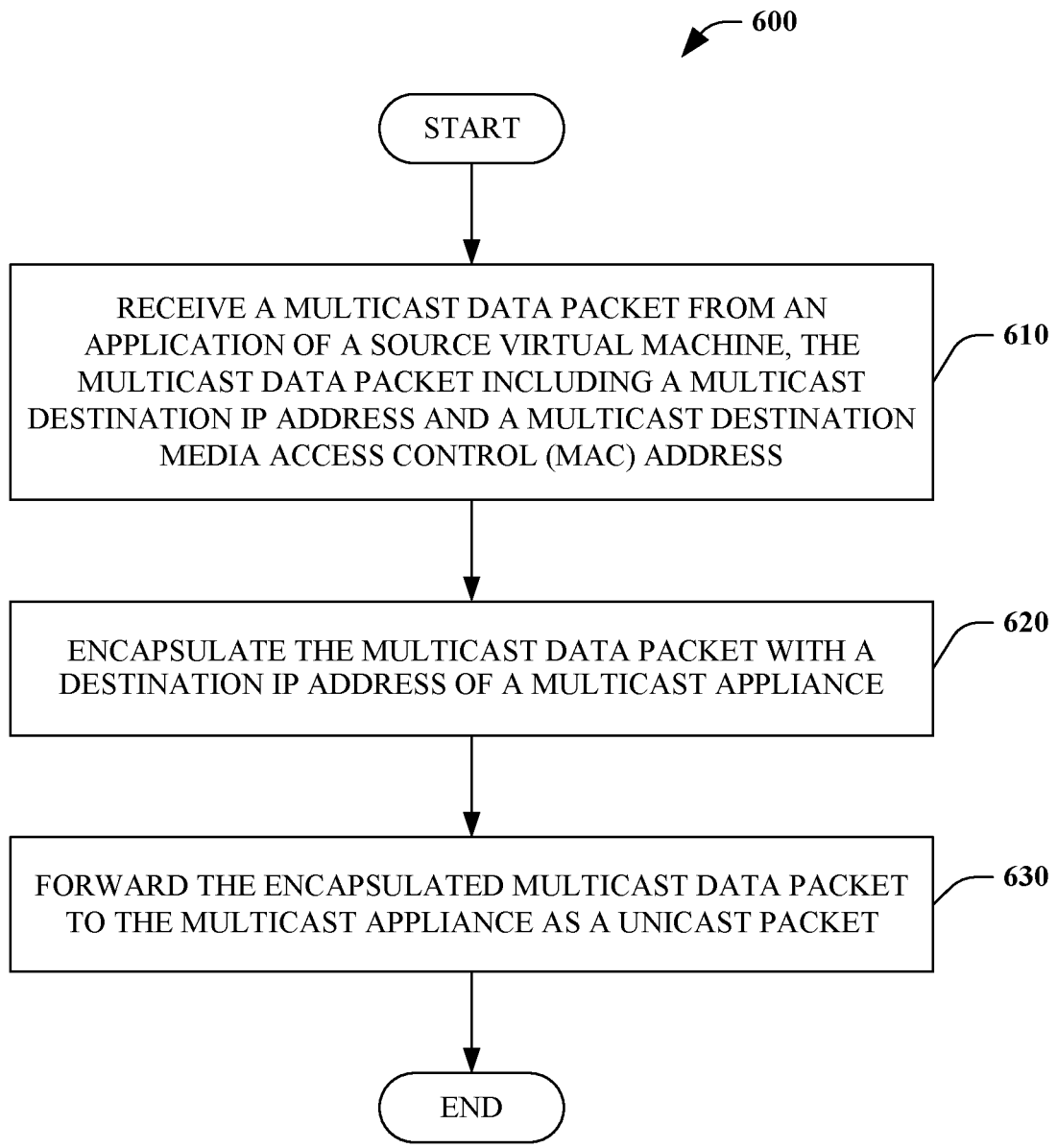
FIG. 6 is a flow chart that illustrates a method of supporting multicast for a virtual network.

Next, referring to FIG. 6, a method of supporting multicast on a virtual network 600 is illustrated. In some embodiments, the method 600 is performed by the host node 320 (e.g., node hosting a source virtual machine).

At 610, a multicast data packet is received from an application of the virtual machine. The multicast data packet including a multicast destination IP address and a multicast destination media access control (MAC) address.

At 620, the multicast data packet is encapsulated with a destination IP address of a multicast appliance. At 630, the encapsulated multicast data packet is forwarded to the multicast appliance as a unicast packet.

Figure 7:
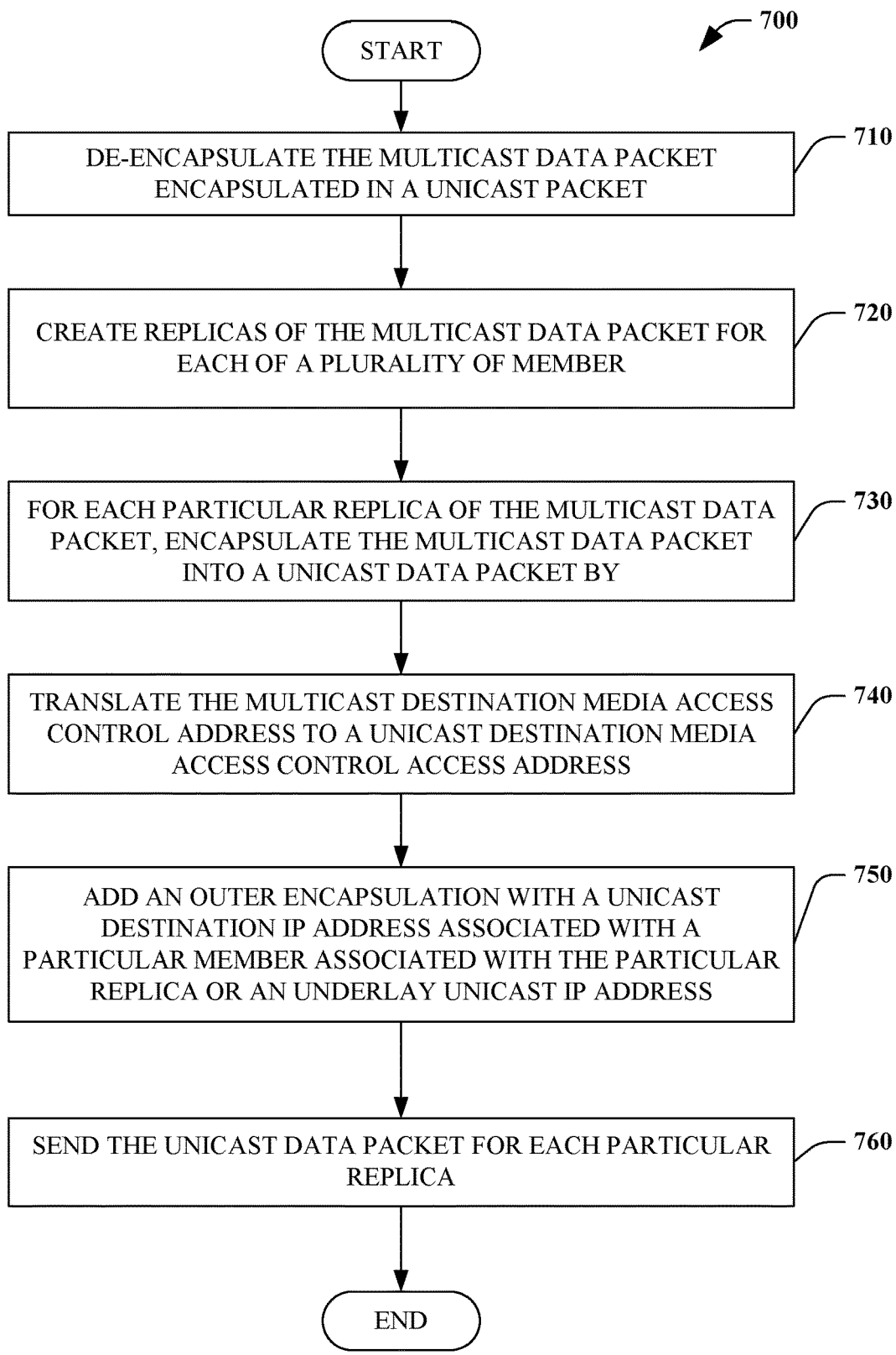
FIG. 7 is a flow chart that illustrates a method of supporting multicast for a virtual network.

Turning to FIG. 7, a method of supporting multicast on a virtual network 700 is illustrated. In some embodiments, the method 700 is performed by the multicast appliance 304.

At 710, the multicast data packet encapsulated as a unicast packet is de-encapsulated. At 720, replicas of the multicast data packet are created for each of a plurality of member.

At 730, for each particular replica of the multicast data packet, the multicast data packet is encapsulated into a unicast data packet by acts 740, 750, and/or 760. At 740, the multicast destination media access control address is translated to a unicast destination media access control access address. At 750, an outer encapsulation with a unicast destination IP address associated with a particular member associated with the particular replica or an underlay unicast IP address is added. At 760, the unicast data packet for each particular replica is sent.

Described herein is a system for supporting multicast on a virtual network, comprising: a computer comprising a processor and a memory having computer-executable instructions stored thereupon which, when executed by the processor, cause the computer to: at a node hosting a source virtual machine of the virtual network: receive a multicast data packet from an application of the source virtual machine, the multicast data packet including a multicast destination IP address and a multicast destination media access control (MAC) address; apply a connectivity policy to the multicast data packet, the policy including at least one of a rule, a network configuration, or a multicast configuration matching the multicast destination IP address, wherein application of the policy creates a replica of the multicast data packet for each of a plurality of members; for each particular replica of the multicast data packet: at least one of translating the multicast destination media access control address to a unicast destination media access control address or modifying the multicast destination IP address to a pre-defined unicast IP address; encapsulating the at least one of translated unicast destination media access control address or pre-defined unicast IP address with underlay unicast IP headers with the destination of a host machine where each particular replica resides to form a unicast data packet for the particular replica; and send the unicast data packet for each particular replica.

The system can include the memory having further computer-executable instructions stored thereupon which, when executed by the processor, cause the computer to: at a node hosting a destination virtual machine: receive a particular unicast data packet encapsulating the multicast data packet; de-encapsulate the particular unicast data packet to recreate the multicast packet, wherein de-encapsulating includes translating the unicast destination media access control access back to the multicast destination media access control address; provide the multicast packet to the destination virtual machine.

The system can further include wherein the node hosting the source virtual machine of the virtual network maintains manages multicast information for multicast communication(s) of the source application including multicast member information. The system can further include wherein the connectivity policy further comprises actions with respect to at least one of a transport layer, a network layer, or an Ethernet layer. The system can further include wherein the connectivity policy further comprises information regarding firewall state or information regarding at least one of a transport layer, a network layer, an Ethernet layer, or a security layer.

The system can further include wherein the connectivity policy further comprises at least one of an encryption key or a decryption key associated with connectivity of the source application. The system can further include wherein the connectivity policy is only applied to the multicast data packet and not the replicas of the multicast data packet. The system can further include wherein the unicast data packet for each particular replica are sent are sequentially. The system can further include wherein the unicast data packet for each particular replica are sent are in parallel.

Described herein is a method of supporting multicast on a virtual network, comprising: at a node hosting a source virtual machine of the virtual network: receiving a multicast data packet from an application of the source virtual machine, the multicast data packet including a multicast destination IP address and a multicast destination media access control (MAC) address; applying a connectivity policy to the multicast data packet, the policy including at least one of a rule, a network configuration, or a multicast configuration matching the multicast destination IP address, wherein application of the policy creates a replica of the multicast data packet for each of a plurality of members; for each particular replica of the multicast data packet: at least one of translating the multicast destination media access control address to a unicast destination media access control address or modifying the multicast destination IP address to a pre-defined unicast IP address; encapsulating the at least one of translated unicast destination media access control address or pre-defined unicast IP address with underlay unicast IP headers with the destination of a host machine where each particular replica resides to form a unicast data packet for the particular replica; and sending the unicast data packet for each particular replica.

The method can further include at a node hosting a destination virtual machine: receiving a particular unicast data packet encapsulating the multicast data packet; de-encapsulating the particular unicast data packet to recreate the multicast packet, wherein de-encapsulating includes translating the unicast destination media access control access back to the multicast destination media access control address; and providing the multicast packet to the destination virtual machine.

The method can further include wherein the node hosting the source virtual machine of the virtual network maintains manages multicast information for multicast communication(s) of the source application including multicast member information. The method can further include wherein the connectivity policy further comprises actions with respect to at least one of a transport layer, a network layer, or an Ethernet layer. The method can further include wherein the connectivity policy further comprises information regarding firewall state or information regarding at least one of a transport layer, a network layer, a security layer, or an Ethernet layer. The method can further include wherein the connectivity policy further comprises at least one of an encryption key or a decryption key associated with connectivity of the source application.

The method can further include wherein the connectivity policy is only applied to the multicast data packet and not the replicas of the multicast data packet. The method can further include wherein the unicast data packet for each particular replica are sent are sequentially. The method can further include wherein the unicast data packet for each particular replica are sent are in parallel.

Described herein is a computer storage media storing computer-readable instructions that when executed cause a computing device to: at a node of the virtual network hosting a source virtual machine: receive a multicast data packet from an application of the source virtual machine, the multicast data packet including a multicast destination IP address and a multicast destination media access control (MAC) address; encapsulate the multicast data packet with a destination IP address of a multicast appliance; and forward the encapsulated multicast data packet to the multicast appliance as a unicast packet.

The computer storage media can store further computer-readable instructions that when executed cause a computing device to: at the multicast appliance: de-encapsulate the multicast data packet encapsulated as the unicast packet; create replicas of the multicast data packet for each of a plurality of member; for each particular replica of the multicast data packet, encapsulate the multicast data packet into a unicast data packet by: translating the multicast destination media access control address to a unicast destination media access control access address; adding an outer encapsulation with a unicast destination IP address associated with a particular member associated with the particular replica or an underlay unicast IP address; and sending the unicast data packet for each particular replica.

Figure 8:
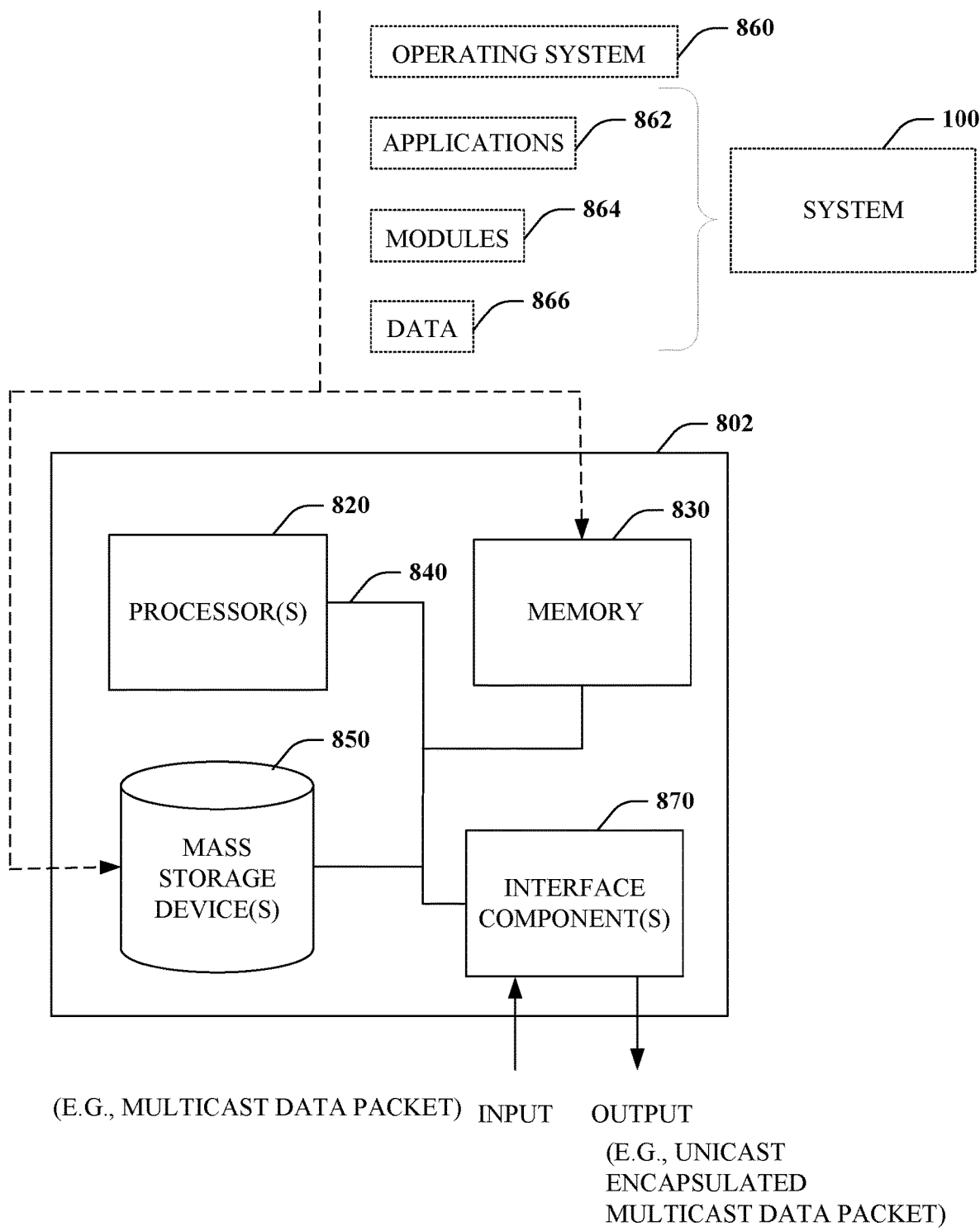
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a system for multicast support for a virtual network 100 and/or a system for multicast support for a virtual network 300.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In some embodiments, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for supporting multicast on a virtual network, comprising:
   a computer comprising a processor and a memory having computer-executable instructions stored thereupon which, when executed by the processor, cause the system to:
   receive a multicast data packet from an application of a source virtual machine of the virtual network, the multicast data packet including a multicast destination Internet Protocol (IP) address and a multicast destination media access control address;
   apply a connectivity policy to the multicast data packet to match a multicast configuration to the multicast destination IP address;
   based on matching the multicast configuration to the multicast destination IP address, generate a replica of the multicast data packet for a member to the multicast data packet;
   establishing a packet flow for the replica to enable bypassing of the connectivity policy to the replica;
   forming a unicast data packet by encapsulating the replica with an underlay unicast IP header that indicates a destination of a host machine associated with the replica; and
   in accordance with the established packet flow, sending the unicast data packet to the destination indicated in the underlay unicast IP header.

2. The system of claim 1, the memory having computer-executable instructions stored thereupon which, when executed by the processor, cause the system to:
   receive the unicast data packet;
   de-encapsulate the unicast data packet to recreate the multicast packet, wherein de-encapsulating includes translating a unicast destination media access control access to a multicast destination media access control address; and
   provide the multicast packet to a destination virtual machine.

3. The system of claim 1, wherein a node hosting the source virtual machine of the virtual network maintains multicast information for multicast communication(s) of a source application including multicast member information.

4. The system of claim 1, wherein the connectivity policy comprises actions with respect to at least one of a transport layer, a network layer, or an Ethernet layer.

5. The system of claim 4, wherein the connectivity policy further comprises information regarding firewall state or information regarding at least one of a transport layer, a network layer, an Ethernet layer, or a security layer.

6. The system of claim 4, wherein the connectivity policy comprises at least one of an encryption key or a decryption key associated with connectivity of a source application.

7. The system of claim 1, wherein the bypassing of the connectivity policy comprises the connectivity policy being applied to the multicast data packet and not the replicas of the multicast data packet.

8. The system of claim 1, wherein unicast data packets for subsequent replicas are sent sequentially.

9. The system of claim 1, wherein unicast data packets for subsequent replicas are sent are in parallel.

10. A method of supporting multicast on a virtual network comprising a plurality of nodes, the method comprising:
    receiving a multicast data packet from an application of a source virtual machine of the virtual network, the multicast data packet including a multicast destination IP address and a multicast destination media access control address;
    applying a connectivity policy to the multicast data packet to match a multicast configuration to the multicast destination IP address;
    based on matching the multicast configuration to the multicast destination IP address, generating a replica of the multicast data packet for a member to the multicast data packet;
    establishing a packet flow for the replica;
    forming a unicast data packet by encapsulating the replica with an underlay unicast IP header that indicates a destination of a host machine associated with the replica; and
    in accordance with the established packet flow, sending the unicast data packet to the destination indicated in the underlay unicast IP header.

11. The method of claim 10, further comprising:
    receiving the unicast data packet;
    de-encapsulating the unicast data packet to recreate the multicast packet, wherein de-encapsulating includes translating a unicast destination media access control access back to a multicast destination media access control address; and
    providing the multicast packet to a destination virtual machine.

12. The method of claim 10, wherein a node hosting the source virtual machine of the virtual network maintains multicast information for multicast communications of the source application including multicast member information.

13. The method of claim 10, wherein the connectivity policy comprises actions with respect to at least one of a transport layer, a network layer, or an Ethernet layer.

14. The method of claim 10, wherein the connectivity policy comprises information regarding firewall state or information regarding at least one of a transport layer, a network layer, a security layer, or an Ethernet layer.

15. The method of claim 14, wherein the connectivity policy further comprises at least one of an encryption key or a decryption key associated with connectivity of the source application.

16. The method of claim 10, wherein the connectivity policy is only applied to the multicast data packet and not replicas of the multicast data packet.

17. The method of claim 10, wherein unicast data packets for subsequent replicas are sent sequentially.

18. The method of claim 10, wherein unicast data packets for subsequent replicas are sent in parallel.

19. A non-transitory computer storage media storing computer-readable instructions that when executed by a processor of a system, cause the system to:
- receive a multicast data packet from an application of a source virtual machine of a virtual network, the multicast data packet including a multicast destination Internet Protocol (IP) address and a multicast destination media access control address;
- apply a connectivity policy to the multicast data packet to match a multicast configuration to the multicast destination IP address;
- based on matching the multicast configuration to the multicast destination IP address, generate a replica of the multicast data packet for a member to the multicast data packet;
- establish a packet flow for the replica to enable bypassing of the connectivity policy to the replica;
- encapsulate the multicast data packet with a destination IP address of a multicast appliance, the multicast appliance configured to process multicast data packets received as unicast packets; and
- forward the encapsulated multicast data packet to the multicast appliance as a unicast packet.

20. The non-transitory computer storage media of claim 19, wherein the multicast appliance is configured to:
- de-encapsulate the multicast data packet encapsulated as the unicast packet;
- create replicas of the multicast data packet for each of a plurality of members;
- for each replica of the multicast data packet, encapsulate the multicast data packet into a unicast data packet by:
  - translating the multicast destination media access control address to a unicast destination media access control access address;
  - adding an outer encapsulation with a unicast destination IP address associated with a particular member associated with the replica or an underlay unicast IP address; and
  - sending the unicast data packet for each replica.

\* \* \* \* \*